United States Patent [19]

Osaki et al.

[11] 4,315,322
[45] Feb. 9, 1982

[54] MICROIMAGE REGISTRATION SYSTEM FOR LOADING AND/OR UPDATING MICROFICHES IN MICROFILM CASSETTE LIBRARY

[75] Inventors: Mikio Osaki, Kashihara; Hiroshi Kamada, Yamatokoriyama; Kohichi Kakimoto, Matsuyama; Toshiaki Tabuchi, Nara, all of Japan

[73] Assignee: Sharp Kabushiki Kaisha, Osaka, Japan

[21] Appl. No.: 54,451

[22] Filed: Jul. 3, 1979

Related U.S. Application Data

[63] Continuation of Ser. No. 600,137, Jul. 30, 1975, abandoned.

[30] Foreign Application Priority Data

Jul. 30, 1974 [JP] Japan .................................. 50/88842
Aug. 2, 1974 [JP] Japan .................................. 50/89222

[51] Int. Cl.³ ............................................. G06F 3/00
[52] U.S. Cl. ................................ 364/900; 353/27 A; 355/43
[58] Field of Search ... 364/200 MS File, 900 MS File, 364/518; 355/43, 44, 45; 353/27 R, 27 A; 235/92 MP; 358/102

[56] References Cited

U.S. PATENT DOCUMENTS

| | | | |
|---|---|---|---|
| Re. 26,919 | 6/1970 | Hagelbarger et al. | 364/900 |
| 3,429,436 | 2/1969 | Irasek | 209/609 |
| 3,585,597 | 6/1971 | Holmerud | 364/200 |
| 3,704,451 | 11/1972 | Pearson | 364/900 |
| 3,708,677 | 1/1973 | Volk et al. | 250/557 |
| 3,732,546 | 5/1973 | Ronkin et al. | 364/200 |
| 3,768,897 | 10/1973 | Spani | 353/26 R |
| 3,865,478 | 2/1975 | Ooue et al. | 353/26 R |
| 3,868,645 | 2/1975 | Delplanque et al. | 364/900 |
| 3,909,796 | 9/1975 | Kitamura | 364/900 |
| 4,134,674 | 1/1979 | Ohsaki et al. | 355/43 |

Primary Examiner—Gareth D. Shaw
Assistant Examiner—A. E. Williams, Jr.
Attorney, Agent, or Firm—Birch, Stewart, Kolasch & Birch

[57] ABSTRACT

In an improved system for loading new microfiches, or updating previously stored microfiches, in a microfilm cassette library; a registration mode is provided whereby a keyboard operator can register keyword a and other index information for specific frames while these microimages are concurrently being projected on a viewing screen. Structures are included for receivingand holding fiches or cassettes being registered, for positioning frames for optical projection, and for reading magnetically encoded fiche identity data. Both buffer memory and file memory means are provided for storage of frame address information including cartridge identity, microfiche identity, X and Y axes coordinates, and other index data. Microcomputer means are provided for overall control of the registration of new fiches and for retrieval of same.

7 Claims, 4 Drawing Figures

MICROIMAGE REGISTRATION SYSTEM FOR LOADING AND/OR UPDATING MICROFICHES IN MICROFILM CASSETTE LIBRARY

This application is a continuation of copending application Ser. No. 600,137, filed on July 30, 1975, now abandoned.

BACKGROUND OF THE INVENTION

The present invention relates generally to an improvement in a microfilm retrieval system for retrieving a certain specified microimage from multiple items of information recorded on a suitable storage medium such as a microfiche, and more particularly to an improved system with information updating capabilities by which an operator can register a new microfiche with its identifying information in a microfiche library.

It is customary in the art of microfilm retrieval that a specified microfiche containing a specified microimage to be selected is automatically retrieved from a number of microfiches each having a capacity of, for example, 98 or 72 microimage or frames, the thus retrieved microimage being moved with respect to X and Y axes coordinates in a manner to project it onto a viewing screen.

In conventional microfilm retrieval systems, when it is desired to retrieve a specified microimage, the operator must look up address information relating to such specified microimage by, for example, viewing a look up table describing multiple items of index information (i.e., primary information consisting of title information) and corresponding multiple items of address information (i.e., secondary information consisting of microfiche identity number, microimage X and Y axes coordinates). The secondary information thus preselected is entered via a keyboard such that only one microfiche containing the specified microimage is automatically retrieved from a microfiche library for magnification and projection onto a viewing screen.

However, in the prior art systems, in the case in which an operator adds a new microfiche and updates the microfiche library, it is necessary that multiple items of index information and multiple items of corresponding secondary information are additionally hand written onto a look up table. This requires such labor and creates a possibility of registration error. Moreover, the selection operation for such additional information difficult because the additional items of information may be generally stored in random order.

It is, therefore, an object of the present invention to provide an improved microfilm retrieval system having information updating capabilities which enable the operator to add comparatively easily and accurately new microfiches to a microfiche library.

BRIEF DESCRIPTION OF THE DRAWINGS

Other objects and many of the attendant advantages of the present invention will be readily appreciated as the same becomes better understood by reference to the following detailed description considered in conjunction with the accompanying drawings in which like reference numerals designate like parts throughout the figures thereof, and wherein.

DESCRIPTION OF THE PREFERRED EMBODIMENTS

Figures 1, 2:
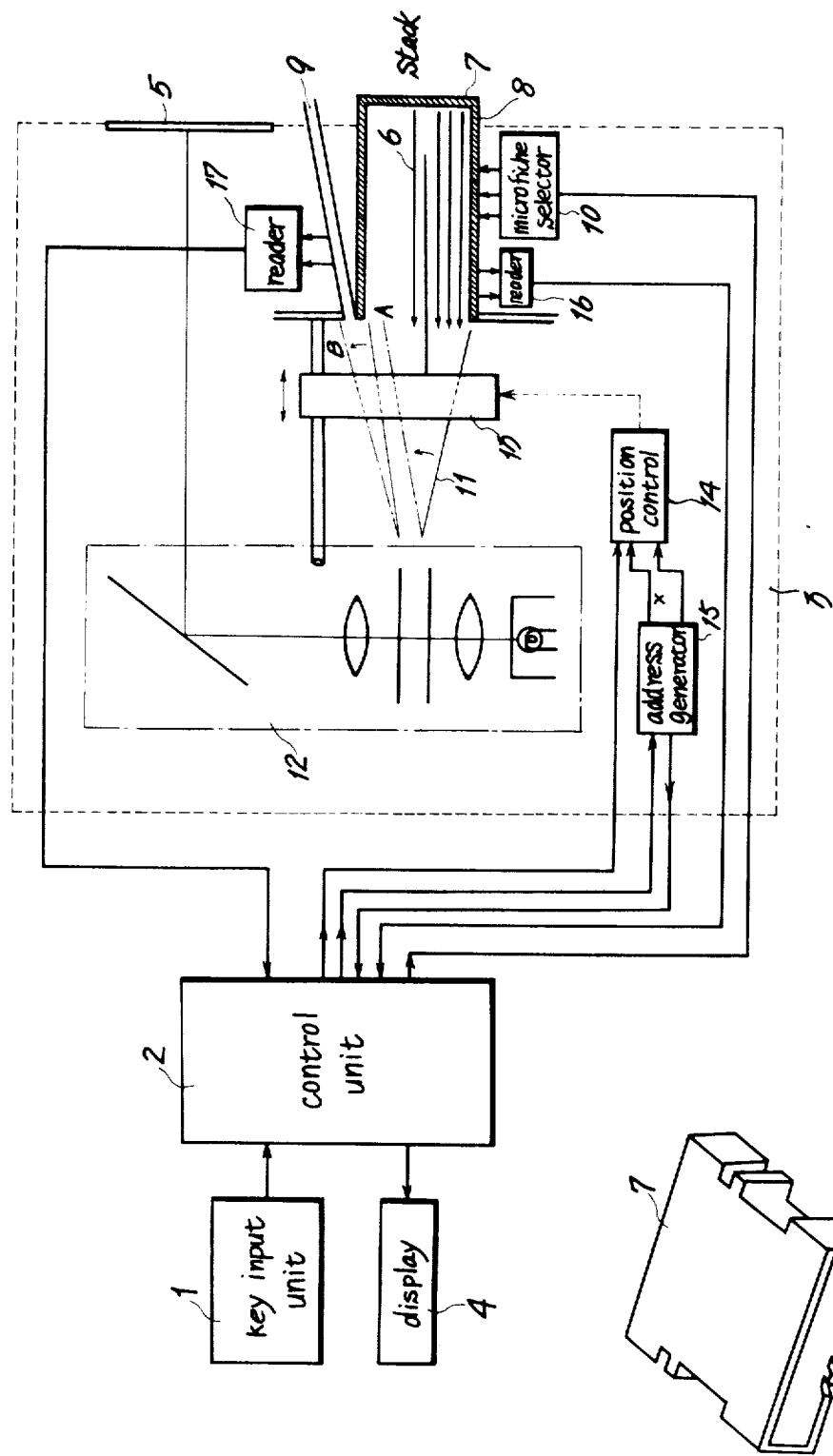
FIG. 1 is a schematic diagram showing a preferred form of a microfilm retrieval system constructed in accordance with teachings of the present invention.
FIG. 2 is a perspective view showing an example of a cartridge used with the system of FIG. 1.
Figures 3, 4:
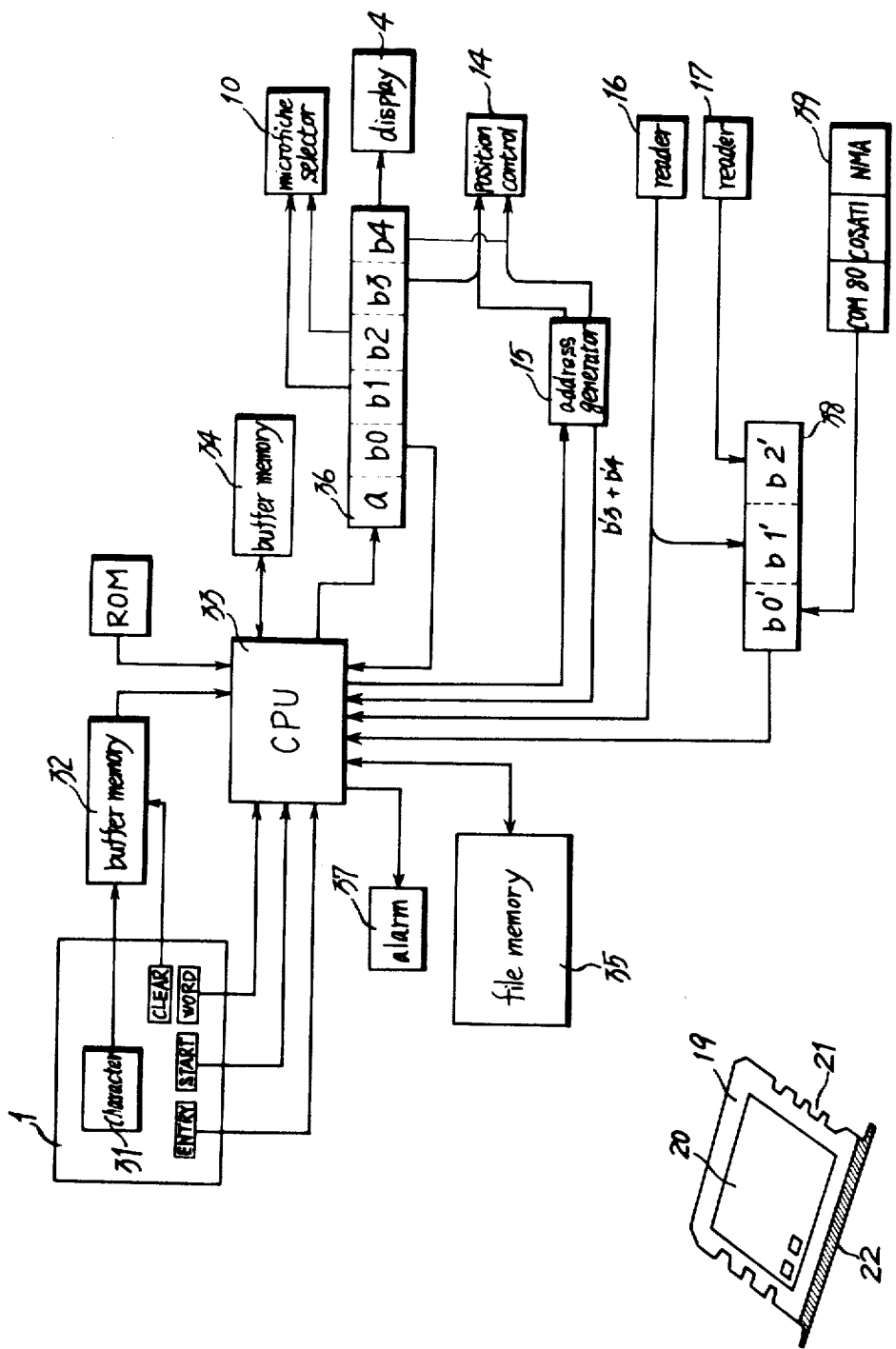
FIG. 3 is a perspective view showing an example of a microfiche used with the system of FIG. 1.
FIG. 4 is a wiring diagram showing a circuit construction of the system of FIG. 1.

Referring now to FIGS. 1 and 4 there is illustrated a schematic diagram of a preferred embodiment of a microfilm retrieval system of the present invention. A key input unit 1 includes character keys (alphanumeric keys), 10 digit keys and a variety of function keys, for example, [WORD], [START], [ENTRY] and [CLEAR], for introduction of retrieval item information and updating information. The [WORD] key is used to indicate completion of one word when in retrieval mode or learn mode (or registration mode). The [START] key indicates start in retrieval mode or registration mode. The [ENTRY] key indicates registration mode when source data is manually registered through the use of the character keys or the digit keys. The [CLEAR] key is available for correcting errors in the operator's key operation.

The key input unit 1 set forth above is not a type which provides simply microfiche identity number and frame address information for a specified item to be retrieved. That is, in the field of literature retrieval, titles, key words or author names of respective literatures are entered as index information inputs in accordance with the present system (i.e., at a high language level). For example, introduction of a specified personal name "Taro Yamada" recalls its associated microfiche containing various items of information corresponding to that person recorded at a specified frame. Input signals from the key input unit 1 are entered into a control unit 2 which includes a CPU 33 (central processing unit), a file memory 35 containing frame address information items (cartridge identity number, frame addresses) corresponding to respective index information items therein, etc., and thus operates as a type of microcomputer.

As will be clear later, comparison is made between the input signals via the key input unit 1 and the file memory 25 containing frame address information of the respective microfiches and, if there is equivalence, that frame address information is sent to a body 3 and concurrently is visually displayed on a display 4 together with the input data.

The body 3 includes a device available for magnification and projection of desired information items onto a viewing screen. More specifically, this comprises a front screen 5, an insertion hole 8 for cartridges 7 each accommodating a predetermined number of microfiches 6 and an additional insertion hole 9 for a new microfiche to be registered in a microfiche library. As is well known to those skilled in the art, the system body 3 further comprises a microfiche selector 10 for selecting a microfiche containing a specified frame within the cartridge 7 in response to signals from the control unit 2, X and Y axes positioning units 13 (X positioning unit is not shown in this schematic drawing) for shifting the thus selected microfiche from the interior of the cartridge 7 to a magnification and projection optics system 12 via a movable transporting plate 11, a frame position control 14 for controlling the X and Y axes positioning units 13 upon receipt of the frame address signals from the control unit 2 and a frame address generator 15 for generating frame address signals of a specified frame being visually displayed onto the viewing screen, the thus generated address signals being sent to the control unit 2. See, for example, U.S. Pat. No. 3,528,735 entitled "MICROIMAGE VIEWER INCLUDING AUTOMATIC MATRIX SELECTION" granted to Thomas P. Bluitt et al on Sept. 15, 1970 as regarding X and Y position control.

There are further provided a pair of readers 16 and 17, the former available for reading out cartridge identity codes provided at the cartridges 7 within the insertion hole 8 and the latter available for reading out identity codes of a new microfiche to be registered within the insertion hole 9. The outputs through the readers 16 and 17 are sent to the control unit 2.

By way of example, the cartridge 7 has a typical shape shown in FIG. 2 wherein cartridge identity codes 18 formed at one side thereof are readable through the use of the reader 16. The microfiche 6, as shown in FIG. 3, comprises an opaque holder 19 for a fichefilm 20 of which the peripheral portions bear its microfiche identity codes 21 and a magnetic member 22. Cooperation between the codes 21 and the selector 10 permits the desired fiche to be selected from the cartridge, the thus selected fiche being moved out of the cartridge by the Y axis transporters 13 provided with a magnet. The codes 21 are examined by the reader 17 only when the new microfiche is placed at the insertion hole 9.

FIG. 4 is a schematic block diagram showing an electrical construction of the microfilm retrieval system in accordance with the present invention. The following detailed description sets forth retrieval and registration modes of operation in the case where a variety of personal information items in a company are recorded on a multiplicity of microfiches when personal names are used as title or index information items.

If it is required to retrieve desired information items for projection onto the viewing screen 5, the operator manually operates character keys 31 and so forth in the key input unit 1 for introduction of index information, for example, a personal name "Taro Yamada" in this instance. The thus introduced index information is transferred to an input buffer memory 32. Upon depression of the $\boxed{\text{WORD}}$ key the index information temporarily stored in the input buffer memory 32 is sent via CPU 33 to a buffer memory 34. Subsequent depression of the $\boxed{\text{START}}$ key allows CPU 33 to initiate comparison between the index information stored in the buffer memory 34 and the contents of the file memory 35 containing a limited amount of frame address information. If there is equivalence, the corresponding frame address information is derived and then stored in a buffer memory 36. Such data consists of an index item a and frame position items b, the latter consisting of microfiche format designation codes $b_0$ (from a format designation switch 39), cartridge identity codes $b_1$, microfiche identity codes $b_2$, X axis positioning information $b_3$ and Y axis positioning information $b_4$. These items except the format designation codes $b_0$ are outputted on the display 4. For example, when $\boxed{\text{TARO YAMADA}}$ $\boxed{8}$ $\boxed{15}$ $\boxed{2}$ $\boxed{3}$ is displayed, the operator selects the #8 cartridge and inserts the same into the hole 8. The microfiche identity codes $b_2$ within the address information stored in the buffer memory 36 are sent to the microfiche selector 10 and hence used as information for selection of the desired microfiche 6 from the cartridge 7.

In addition, the X and Y axes coordinate information $b_3$ and $b_4$ are sent to the frame positioning control 14 to notify the X and Y axes transporters 13 of their stop positions pursuant to the designated format.

By virtue of signal transmission set forth above, the specific microfiche designated by the operator is selected from the cartridge 7 accommodating a multiplicity of microfiches therein via the microfiche selector 10 and then transferred to the optics system 12 by the X and Y axes transporters 13 for magnification and projection onto the viewing screen 5. When the microfiche being projected is desired to be returned to the interior of the cartridge, the movable transporting plate 11 is shifted to the position A in response to indication of the subsequent retrieval operation and then the transporters 13 are reverted to their initial positions.

The cartridge identity code $b_1$ is confirmed by comparison between information sent from the cartridge code reader 16 and CUP 33. If non-equivalence occurs, an alarm 37 is activated to indicate error.

The registration mode is carried out in the following manner.

In the case that a new microfiche is registered in accordance with the system of the present invention, the function key $\boxed{\text{ENTRY}}$ within the key input unit 1 is first operated so that the whole of the system is forced into the registration mode. The microfiche to be registered is inserted into a vacant holder 19 and then into the insertion hole 9. The cartridge 7 to which the new microfiche is to be added is inserted into the insertion hole 8. At this time the switch 39 is set at a desired format.

The subsequent operation of the $\boxed{\text{START}}$ key permits the readers 16 and 17 to read out the cartridge identity number and updating microfiche identity number, the thus read out contents being stored in the buffer memory 38 along with the format designation code $b_0'$. The X and Y axes transporters 13 become active in the same manner as in the retrieval mode such that the microfiche is moved to the optics system 12 to project a certain microimage (for example, the first frame) onto the viewing screen 5.

In this case the frame addresses necessary for positioning are created from the frame address generator 15 in accordance with the format designation code $b_0$ under control of CPU 33 and then sent to the frame position control 14. While the operator views the image being concurrently projected, the operator enters the title or key word concerning the information being concurrently projected as registration information via the key input unit 1. The thus entered registration information is temporarily stored in the buffer memory 32. Upon depression of the $\boxed{\text{WORD}}$ key indicating completion of one-word, CPU 33 combines registration information stored in the input buffer memory 32 and the microfiche format information, the cartridge identity code information, the microfiche identity code information the contents of the frame address generator generator ($b_3'$ and $b_4'$) and the contents ($b_0'$, $b_1'$, $b_2'$) stored in the buffer memory 38 and the thus combined data is stored in the file memory 35. The frame address generator 15 also creates the next succeeding address upon depression of the $\boxed{\text{WORD}}$ key such that the next frame is automatically projected and the system is ready for entry of another registration information.

As noted earlier, in accordance with the system of the present invention, the operator can perform the registration mode by only entering index information while viewing the projection image, without searching image address information.

In the case where a number of microfiches are to be registered, these new microfiches are together inserted into a new cartridge which in turn is positioned at the hole 8 to enable the registration mode. In this case the frame address generator 15 is provided with a fiche number generator which activates the microfiche selector 10. The signals from the fiche number generator are used instead of the fiche identity code reader outputs. While only certain embodiments of the present invention have been described, it will be apparent to those skilled in the art that various changes and modifications may be made therein without departing from the spirit and scope of the invention as claimed.

What is claimed is:

1. Means for registering microimages in a microfilm retrieval library system to update said system wherein a plurality of cassettes are stored, each of said cassettes containing a predetermined number of film members, each of the latter carrying a predetermined number of microimages and each of said cassettes having a precoded cassette identity number and each of said film members having a precoded film identity number, said system comprising an optical viewing screen for projecting thereon information recorded on each of said microimages and an X-Y position control associated with said viewing screen for receiving a said film member and controlling the position of said respective microimages thereon for projecting purposes, said means for registering new microimages comprising:

receiving means for receiving a new film member to be loaded into said system and a cassette for retaining said new film member therein;

storage means for registering the identity of each film member, each microimage identity thereon, the category of information contained therein, and the cassette identity thereof when a new film member is loaded into said system;

a key input means selectively activated subsequent to receipt of a said new film member in said receiving means for introducing key words into said system corresponding to a given category of information contained in the microimages in said new film member;

an X-Y coordinate counter enabled by said key input means and presettable at a given count subsequent to receipt of said new film member in said X-Y position control, of which the count provides a control constraint for said X-Y position control;

a first reader enabled by said key input means for reading out a said precoded cassette identity number from and corresponding to said cassette for retaining said new film member subsequent to receipt of said new film member in said receiving means;

a second reader enabled by said key input means for reading out said precoded film identity number from and corresponding to said new film member subsequent to receipt of said new film member in said receiving means;

said X-Y position control means being responsive to said key input means for positioning a first microimage for projection;

frame address means receiving said count from said X-Y coordinate counter and responsive to said key input means to constrain said X-Y position control means to position each additional microimage on said new film member for projection and for reading out the count of said X-Y coordinate counter as an image identity number corresponding to each said microimage positioned for projection on said viewing screen; and control means responsive to said key input means, for interconnecting said storage means, said first and second readers and said frame address means for putting into said storage means within said system the said key word from said key input means, the said precoded cassette identity number from said first reader, the said precoded film identity number from said second reader, and the said microimage identity number from said frame address means to register each of said microimages and thereby load said new film member into said system subsequent to the receipt of said new film member in said receiving means.

2. A means for registering microimages in a microfilm retrieval library system in accordance with claim 1 wherein said storage means comprises a file memory means; and wherein said X-Y coordinate counter comprises an address generator means, said address generator means generating an X output signal and a Y output signal corresponding to X and Y address coordinates, respectively, on a given said film member.

3. A means for registering microimages in a microfilm retrieval library system in accordance with claim 2 wherein said frame address means comprises:

a buffer memory means responsive to said X output signal and said Y output signal from said address generator means and to said control means for storing the count of said address generator means therein as said image identity number comprising said X and Y address coordinates corresponding to said microimage positioned for projection on said viewing screen, and responsive to said control means to generate a display information signal;

a display means responsive to said display information signal from said buffer memory means for displaying said image identity number stored in said buffer memory means; and position control means responsive to said X output signal and said Y output signal from said address generator means for constraining said X-Y position control means to position each additional microimage on said new film member for projection on said viewing screen.

4. A means for registering microimages in a microfilm retrieval library system in accordance with claim 3 wherein said control means comprises central processing unit means; and wherein said means for registering microimages in a microfilm retrieval library system further comprises input buffer memory means responsive to the introduction of said key words into said system via said key input means for storing said key words therein, said input buffer memory means generating a key word information outsignal for introduction to said central processing unit means.

5. A means for registering microimages in a microfilm retrieval library system in accordance with claim 4 wherein said key input means further comprises a plurality of operation key means for designating selected operations of said means for registering microimages in said microfilm retrieval library system.

6. A means for registering microimages in a microfilm retrieval library system in accordance with claim 5 wherein said central processing unit means passes said key words stored in said input buffer memory means, said image identity number stored in said buffer memory means, said cassette identity number from said first reader and said film identity number from said second reader to said file memory means for storage therein in response to actuation of a selected one of said plurality of operation key means.

7. A means for registering microimages in a microfilm retrieval library system in accordance with claim 6 wherein a new one of said microimages on said new film member is projected onto said viewing screen in response to actuation of said selected one of said operation key means.

* * * * *